(12) United States Patent
Sakemi

(10) Patent No.: US 10,235,110 B2
(45) Date of Patent: Mar. 19, 2019

(54) INFORMATION PROCESSING APPARATUS AND AUTHENTICATION SYSTEM

(71) Applicant: Satoshi Sakemi, Kanagawa (JP)

(72) Inventor: Satoshi Sakemi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/973,949

(22) Filed: May 8, 2018

(65) Prior Publication Data
US 2018/0357024 A1 Dec. 13, 2018

(30) Foreign Application Priority Data
Jun. 7, 2017 (JP) .................................. 2017-112968

(51) Int. Cl.
G06F 3/12 (2006.01)
H04N 1/00 (2006.01)

(52) U.S. Cl.
CPC .......... G06F 3/1239 (2013.01); G06F 3/1219 (2013.01); H04N 1/00408 (2013.01); H04N 1/00832 (2013.01); H04N 1/00838 (2013.01); H04N 2201/0094 (2013.01)

(58) Field of Classification Search
USPC ..................................................... 358/1.14
See application file for complete search history.

(56) References Cited

U.S. PATENT DOCUMENTS

2008/0028449 A1* 1/2008 Shigeeda .............. G06F 21/608 726/6
2008/0068647 A1* 3/2008 Isobe .................. H04N 1/00413 358/1.15

FOREIGN PATENT DOCUMENTS

JP 2004-102356 4/2004
JP 2010-198221 9/2010

* cited by examiner

*Primary Examiner* — Ngon B Nguyen
(74) *Attorney, Agent, or Firm* — Duft & Bornsen, PC

(57) ABSTRACT

An information processing apparatus includes processors and memories to store a plurality of instructions which cause the processors to store, in the memories, usage authority information associating, for each of users, user information identifying the user with authority information. The authority information associates, for each of image forming apparatuses, device information identifying the image forming apparatus with function information indicating function of the image forming apparatus allowed to be executed or restricted from being executed. Based on success of an authentication process for a login request from the user to the image forming apparatus, The processor specifies the function information corresponding to the device information of the image forming apparatus as the login request source, using the usage authority information corresponding to the user information of the user, creates response information set with the specified function information, and sends the created response information to the image forming apparatus.

11 Claims, 12 Drawing Sheets

FIG. 5A

| USER ID | USER NAME | PASSWORD | AUTHORIZATION ID |
|---|---|---|---|
| Usr1 | Un1 | aaa | Per1 |
| Usr2 | Un2 | bbb | Per2 |
| ⋮ | ⋮ | ⋮ | ⋮ |

FIG. 5B

| ASSIGNMENT ID | AUTHORIZATION ID | SCOPE OF AUTHORITY | DEVICE ID |
|---|---|---|---|
| Per_assn1 | Per1 | Per_deft1 | Dev1 |
|  |  |  | Dev2 |
|  |  |  | Dev3 |
| Per_assn2 | Per1 | Per_deft2 | Dev4 |
|  |  |  | Dev5 |
| Per_assn3 | Per1 | Per_deft3 | Dev6 |
| Per_assn4 | Per2 | Per_deft4 | Dev7 |
| ⋮ | ⋮ | ⋮ | ⋮ |

FIG. 5C

| DEVICE ID | SERIAL NUMBER |
|---|---|
| Dev1 | S1 |
| Dev2 | S2 |
| ⋮ | ⋮ |

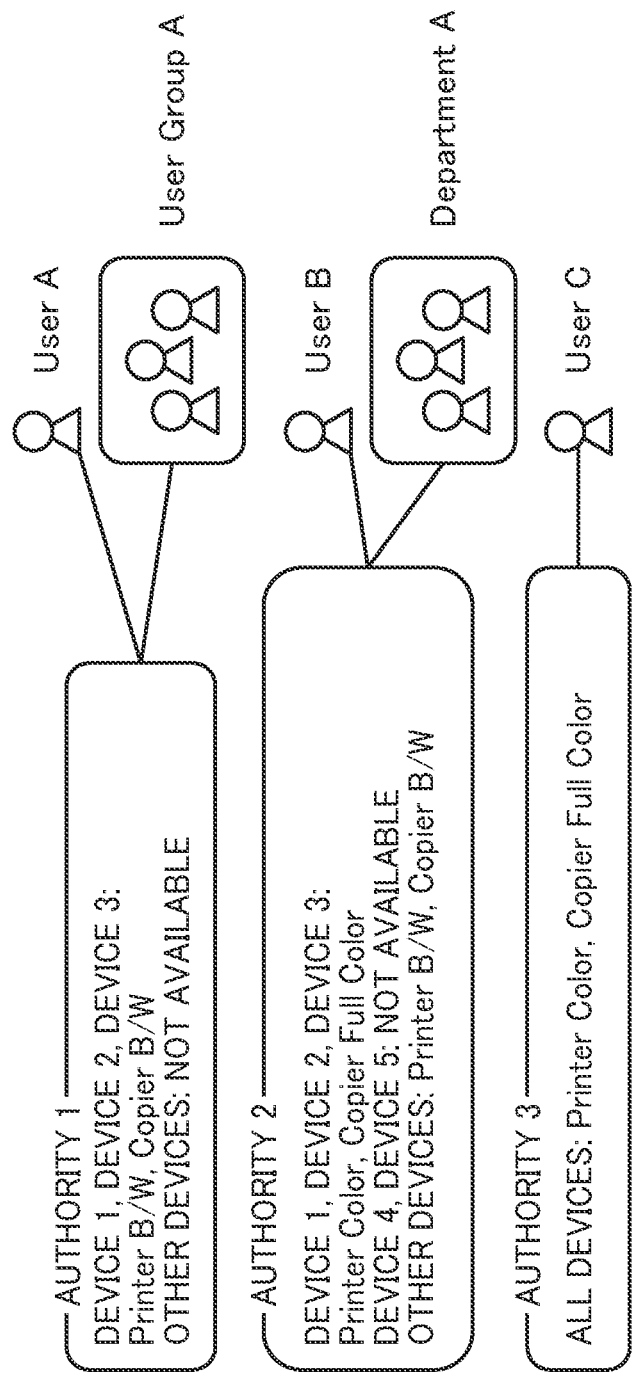

FIG. 7

(1) ∨ Permission Properties
| Permission Settings | Departments | Groups | Users | (2)

Permission Name*: [          ]
Permission Description: [          ] (3)

⊕ ⊖
(4) | Permission1 | Permission2 | Permission3 | Permission4 |
∨ Built-in Functions
☐ Allow all Built-in Applications    ☐ Deny Login
Copier:
  ☐ Full Color Auto Selection    ☐ Full Color
  ☐ Two-color                    ☐ Single Color    (5)
  ☐ Black and White
Printer:
  ☐ Color                        ☐ Black and White
Other
Functions:
  ☐ Document Server              ☐ Facsimile
  ☐ Scanner ∨ Workflows
☐ Allow all Workflows
Workflows: [      ∨]    (6)

∨ Target Devices
[ Edit Device List ]

Device1                          (7)
Device2

FIG. 9

| Devices | Users × | Permissions × | | | | |
|---|---|---|---|---|---|---|
| Permission Name | Departments | Groups | Users | Update by | Update Date | |
| default | | | | System | 2017/04/12 1... | |
| AUTHORITY 1 | | ✓ | | admin | 2017/04/12 1... | |
| AUTHORITY 2 | | | | admin | 2017/04/12 1... | |

(8)

› Permission Properties

| Permission Settings | Departments | Groups | Users | | |
|---|---|---|---|---|---|
| User Name | Authentication Profile | Display Name | Email | Department | |
| asdf | Local | | | | |
| bbb | Local | | | | |

| User Name | Authentic action Profile | Display Name | Permissions | LDAP Synchronization | Update by | Update D... |
|---|---|---|---|---|---|---|
| asdf | Local | | ∨ | | admin | 2017/4/12 1... |
| b | Local | | ∨ | | admin | 2017/4/12 1... |
| bbb | Local | | | | admin | 2017/4/12 1... |
| s | jedi.local | taro | ∨ | ∨ | admin | 2017/4/12 1... |
| test | Local | | ∨ | | admin | 2017/4/12 1... |

∨ User Properties

| User Setting | Groups | Alias | Delegation | Cards | Permissions |

Name: [Inherited Permission ∨] (11)
    default
    No Permission
∨ Built-in Fu  Information 1
  Copie    Information 2
        Inherited Permission
    ☑ Two-color
    ☑ Black and White
  Printer:
    ☑ Color
  Other Functions:
    ☑ Document Server
    ☑ Scanner ☑ Full Color
☑ Single Color ☑ Black and White ☑ Facsimile > Workflows

FIG. 12

```xml
<?xml version="1.0" encoding="UTF-8" standalone="yes"?>
<permission>
        <nativeFunctions>
                <denyLogin>false</denyLogin>
                <allowAllNativeFunctions>true</allowAllNativeFunctions>
                <copier>
                        <fullColor>true</fullColor>
                        <twoColor>true</twoColor>
                        <singleColor>true</singleColor>
                        <blackWhite>true</blackWhite>
                        <fullColorAutoSelection>true</fullColorAutoSelection>
                </copier>
                <printer>
                        <color>true</color>
                        <blackWhite>true</blackWhite>
                </printer>
                <otherfunctions>
                <documentServer>true</documentServer>
                <facsimile>true</facsimile>
                <scanner>true</scanner>
                </otherfunctions>
        </nativeFunctions>
        <workflows>
                <allowAllWorkflows>true</allowAllWorkflows>
        </workflows>
</permission>
```

INFORMATION PROCESSING APPARATUS AND AUTHENTICATION SYSTEM

CROSS-REFERENCE TO RELATED APPLICATION

This patent application is based on and claims priority pursuant to 35 U.S.C. § 119 to Japanese Patent Applications No. 2017-112968, filed on Jun. 7, 2017 in the Japanese Patent Office, the entire disclosure of which is hereby incorporated by reference herein.

BACKGROUND

Technical Field

The present disclosure relates to an information processing apparatus, an authentication system, and a non-transitory recording medium storing an authentication program.

Related Art

Conventionally, a technique to limit use of a multifunction peripheral (MFP) having a copy function and a print function is known. For example, in this technique, an upper limit of usage (number of copies, number of prints, etc.) is determined for each user or group of users using the multifunction peripheral, such that usage beyond the upper limit is restricted. Having the user be aware of the limit of usage of the multifunction peripheral in this manner leads to a reduction in multifunction peripheral expenditures.

SUMMARY

This specification describes an improved information processing apparatus and an improved authentication system.

In one illustrative embodiment, the information processing apparatus includes one or more processors and one or more memories to store a plurality of instructions which, when executed by the processors, cause the processors to store, in the memories, usage authority information associating, for each of one or more users, user information identifying the user with authority information. The authority information associates, for each of one or more image forming apparatuses, device information identifying the image forming apparatus with function information indicating function of the image forming apparatus allowed to be executed or restricted from being executed. Based on success of an authentication process for a login request from the user to the image forming apparatus, the processor specifies the function information corresponding to the device information of the image forming apparatus as the login request source using the usage authority information corresponding to the user information of the user who requested the login, creates response information set with the specified function information, and sends the created response information to the image forming apparatus as the login request source.

In another embodiment, an authentication system includes an integrated management server and a synchronization server. The integrated management server includes one or more processors being configured to acquire usage authority information and transmit the usage authority information acquired to the synchronization serve. The usage authority information associates, for each of one or more users, user information identifying the user with authority information. The authority information associates, for each of one or more image forming apparatuses, device information identifying the image forming apparatus with function information indicating function allowed to be executed or restricted from being executed. The synchronization server includes one or more processors being configured to accept the usage authority information from the integrated management server, based on success of an authentication process for a login request from a user to an image forming apparatus, specify the function information corresponding to the device information of the image forming apparatus as the login request source, using the usage authority information corresponding to the user information of the user who requested the login, create response information in which specified function information is set, and send the created response information to the image forming apparatus as the login request source.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5A is a table illustrating an example of a user table and user table data stored in a setting storage unit;

FIG. 5B is a table illustrating an example of an authorization assignment table and data of the authorization assignment table stored in a setting storage unit;

FIG. 5C is a table illustrating an example of a device table and data of the device table stored in a setting storage unit;

FIG. 6 is a diagram illustrating an outline of usage authority data;

FIG. 7 is a diagram illustrating an example of an authority management screen;

FIG. 9 is an explanatory diagram to describe an example of selecting an object to which the authority is to be applied;

FIG. 11 is a diagram illustrating an example of a user management screen;

FIG. 12 is a diagram illustrating an example of response information; and

Figure 1:
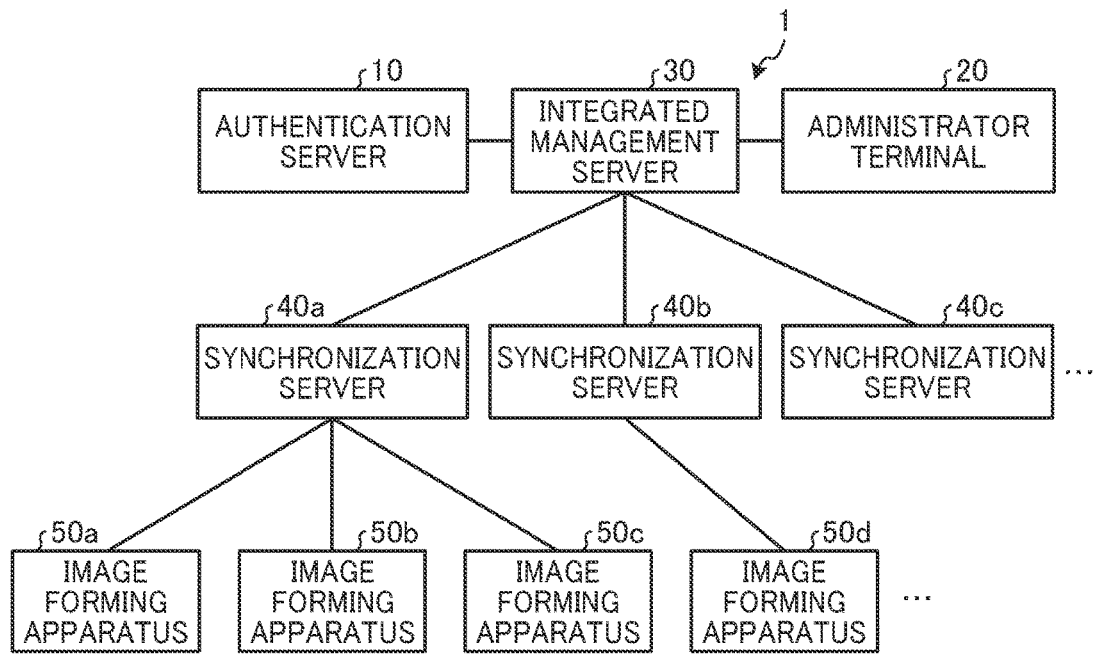
FIG. 1 is a diagram illustrating an example of configuration of an authentication system according to a present embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The embodiments of the present disclosure relate to an information processing system, an authentication system, and an authentication program describe with reference to drawings below. The embodiments, however, are not intended to be limiting of the present disclosure.

With reference to FIG. 1, a system configuration of an authentication system 1 according to the present embodiment is described. FIG. 1 is a diagram illustrating an example of configuration of an authentication system according to a present embodiment.

As illustrated in FIG. 1, the authentication system 1 includes an authentication server 10, an administrator terminal 20, and an integrated management server 30. In addition, the authentication system 1 includes synchronization servers 40a to 40c and image forming apparatuses 50a to 50d. Hereinafter, when each synchronization server is not distinguished, it is simply referred to as "synchronization server 40". Similarly, when each image forming apparatus is not distinguished, it is simply referred to as "image forming apparatus 50". The synchronization server 40 and the image forming apparatus 50 are not limited to the illustrated numbers. The authentication server 10, the administrator terminal 20, the integrated management server 30, the synchronization server 40, and the image forming apparatus 50 may be connected each other via the internet or a local area network (LAN).

The integrated management server 30 is connected to the authentication server and the administrator terminal 20 via a network. In addition, the integrated management server 30 is coupled to a plurality of synchronization servers 40 via a network. Each synchronization server 40 is coupled to one or more image forming apparatuses 50. The image forming apparatus 50 coupled to the synchronization server 40 is a device under the control of the synchronization server 40. For example, under the management of the synchronization server 40a, there are an image forming apparatus 50a, an image forming apparatus 50b, and an image forming apparatus 50c.

The authentication server 10 stores authentication information of each user who uses the image forming apparatus 50. The authentication processing using the authentication information may be executed by the authentication server 10 or may be executed by the integrated management server 30 or the synchronization server 40. The administrator terminal 20 is a terminal which an administrator of the authentication system 1 operates to make various settings. For example, the administrator operates the administrator terminal 20 and sets usage authority information. The usage authority information is information in which user information to identify the user is associated with authority information. The authority information includes one or more pieces of information in which device information to identify the apparatus 50 is associated with function information that indicates functions allowed to be executed by the image forming apparatus 50 or restricted functions that are not to be executed by the image forming apparatus 50.

The integrated management server 30 stores the authentication information acquired from the authentication server 10 and various information input from the administrator terminal 20, and integrally manages these pieces of information. Further, the integrated management server 30 outputs the stored information to the synchronization server 40 as appropriate. Therefore, information stored in the integrated management server 30 is stored by all synchronization servers 40. Since the integrated management server 30 acquires the authentication information from the authentication server 10, the integrated management server 30 can also execute authentication processing.

The synchronization server 40 synchronizes the information stored by the integrated management server 30 and executes various processes using the synchronized information. For example, after user authentication for a login request to the image forming apparatus 50, the synchronization server 40 refers to the usage authority information from the user information of the user who requested a login and the device information of the image forming apparatus 50 as a login request source and specifies the corresponding function information. Then, the synchronization server 40 creates response information in which the specified function information is set. Subsequently, the synchronization server 40 responds with the created response information to the image forming apparatus 50 as the login request source. Since the information stored by the integrated management server 30 is synchronized, the synchronization server 40 can also execute authentication processing.

That is, the synchronization server 40 accepts a login request when the user operates any of the image forming apparatuses 50 managed by the synchronization server 40. The synchronization server 40 executes the authentication processing based on the authentication information stored in synchronization with the integrated management server 30 and the user information of the user who requested the login. Subsequently, after user authentication, the synchronization server 40 refers to the usage authority information from the user information of the user who requested the login and the device information of the image forming apparatus 50 as the login request source and specifies the corresponding function information. The synchronization server 40 creates response information in which the specified function information is set in a file or the like. Subsequently, the synchronization server 40 responds with the created response information to the image forming apparatus 50 as the login request source. The image forming apparatus 50 receives the response information and displays or prints a content of a function allowed or limited by the response information.

The image forming apparatus 50 is a multifunction peripheral that executes a copy function, a printer function, and the like. Receiving a login operation from the user, the image forming apparatus 50 transmits a login request to the synchronization server 40. The synchronization server 40 which the image forming apparatus 50 transmits the login request is the synchronization server 40 that controls the image forming apparatus 50. The image forming apparatus 50 receives response information from the synchronization server 40 in response to the login request. Based on the received response information, the image forming apparatus 50 outputs information (screen) indicating the function whose usage is permitted or restricted. The user selects the function which the user wants to execute in the image forming apparatus 50 and operates the image forming apparatus 50 to execute the function which the user selects. Then the image forming apparatus 50 executes the function selected by the user.

In the present embodiment, the administrator operates the administrator terminal 20 to set which functions are authorized and which are not. Therefore, even if the image forming apparatus 50 can execute various kinds of functions, in reality, depending on the user who uses the image forming apparatus 50, executable functions are different and sometimes limited.

As described above, the authentication system 1 stores the usage authority information in which the user information is associated with the authority information that includes one or more pieces of information in which the device information to identify the apparatus 50 is associated with the function information. The authentication system 1 receives the login request, uses the usage authority information, specifies the function information corresponding to the user information and the device information, and transmits the response information set the specified function information to the image forming apparatus 50 as the login request source. As a result, the authentication system 1 limits use by each user and each MFP.

Figure 2:
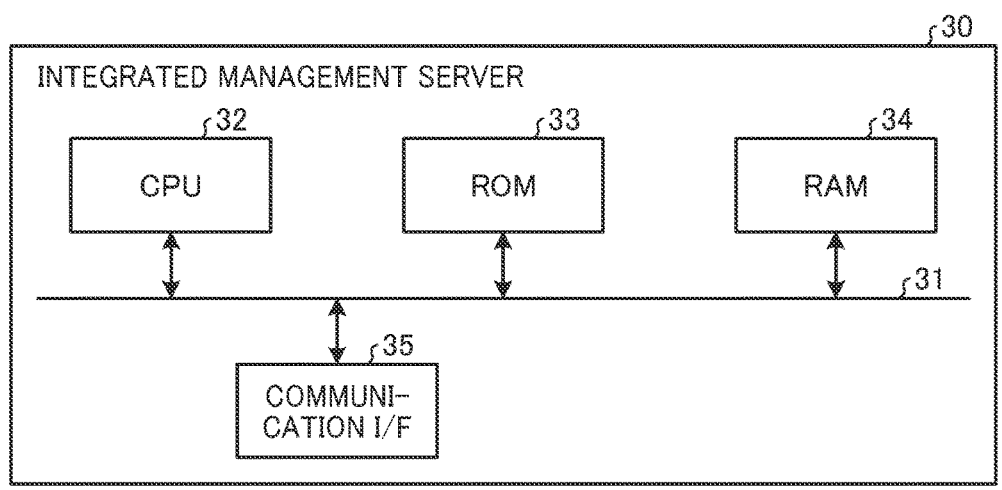
FIG. 2 is a block diagram illustrating a hardware configuration of an integrated management server according to the present embodiment.

Next, with reference to FIG. 2, a hardware configuration of the integrated management server 30 according to the present embodiment is described. FIG. 2 is a block diagram illustrating the hardware configuration of the integrated management server 30 according to the present embodiment.

As illustrated in FIG. 2, the integrated management server 30 includes a central processing unit (CPU) 32, a read only memory (ROM) 33, a random-access memory (RAM) 34, and a communication interface (I/F) 35, which are connected to each other by a bus 31.

The CPU 32 controls all operations of the integrated management server 30. For example, the CPU 32 uses the RAM 34 as a work area and executes a program stored in the ROM 33. As a result, the CPU 32 controls the operation of the integrated management server 30 as a whole. This leads the integrated management server 30 to achieve various kinds of functions described later. The communication interface I/F is an interface that controls communication to the authentication server 10, the administrator terminal 20, and the synchronization server 40, such as a network interface circuit. Other than above described devices, the integrated management server 30 may include an interface that couples an input device such as a keyboard to input various kinds of information, an interface that couples an output device such as a display to output various kinds of information, and a nonvolatile memory such as hard disk drive (HDD) to store various kinds of data.

Figure 3:
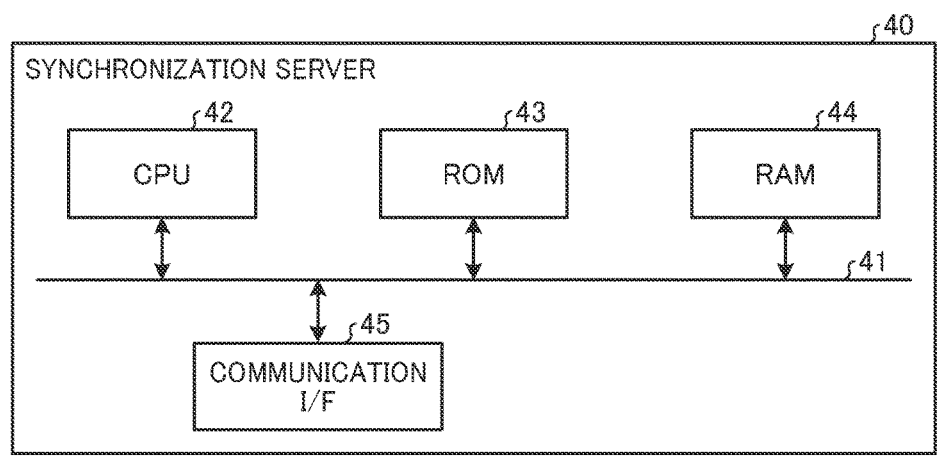
FIG. 3 is a block diagram illustrating a hardware configuration of a synchronization server according to the present embodiment.

Next, with reference to FIG. 3, a hardware configuration of the synchronization server 40 according to the present embodiment is described. FIG. 3 is a block diagram illustrating a hardware configuration of a synchronization server 40 according to the present embodiment.

As illustrated in FIG. 3, the synchronization server 40 includes a CPU 42, a ROM 43, a RAM 44, and an I/F 45, which are connected to each other by bus 41.

The CPU 42 controls all operations of the synchronization server 40. For example, the CPU 42 uses the RAM 44 as a work area and executes a program stored in the ROM 43. As a result, the CPU 42 controls the operation of the synchronization server 40 as a whole. This leads the synchronization server 40 to achieve various kinds of functions described later. The communication interface I/F 45 is an interface that controls communication to the integrated management server 30 and the image forming apparatus 50. Other than above described devices, the synchronization server may include an interface that couples an input device such as a keyboard to input various kinds of information, an interface that couples an output device such as a display to output various kinds of information, and a nonvolatile memory such as hard disk drive (HDD) to store various kinds of data.

Figure 4:
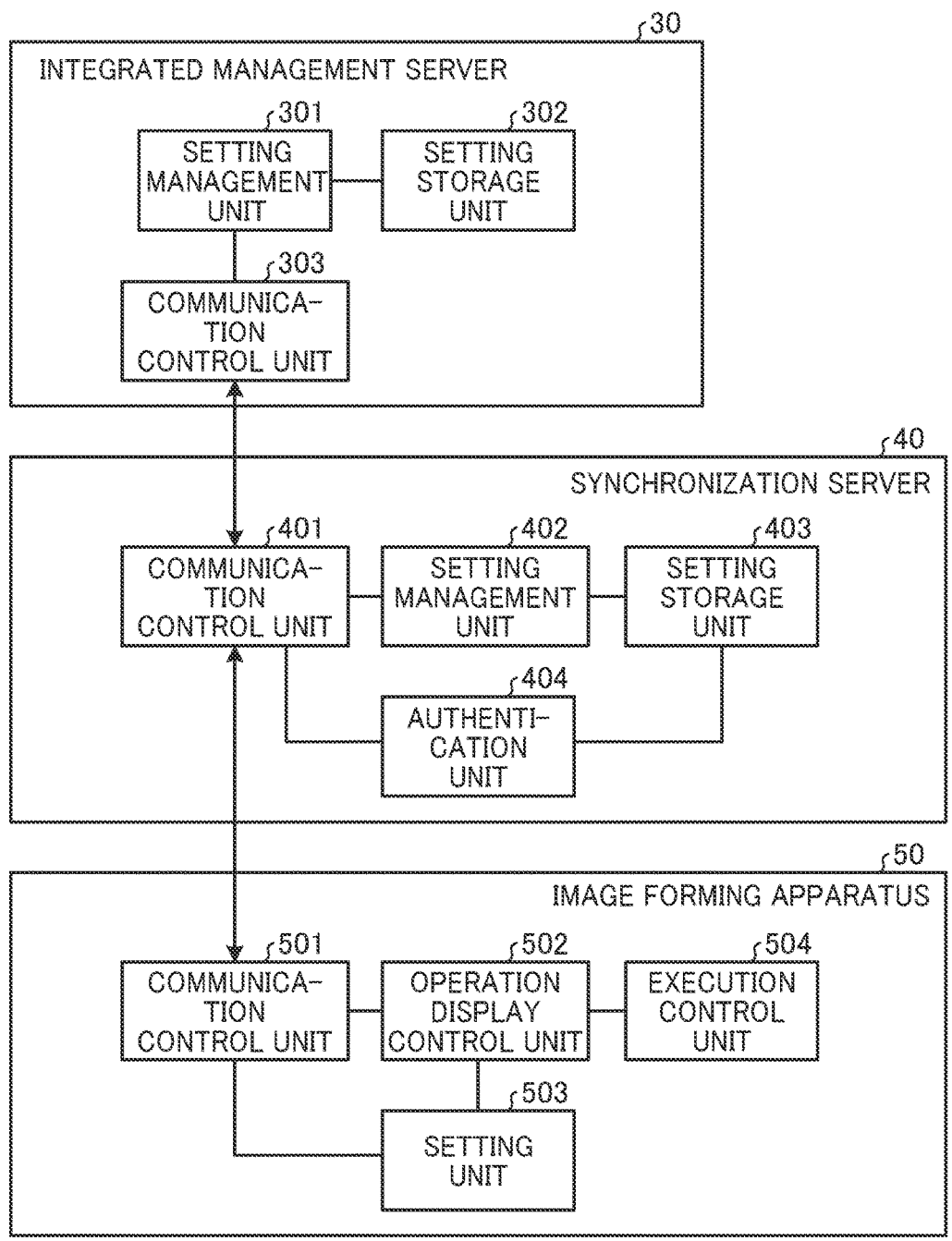
FIG. 4 is a functional block diagram illustrating an example of a functional configuration of devices according to the present embodiment.

Next, with reference to FIG. 4, a functional configuration of the devices according to the present embodiment is described. FIG. 4 is a functional block diagram illustrating an example of a functional configuration of the devices according to the present embodiment. With reference to FIG. 4, descriptions are given below of a functional configuration of the integrated management server 30, the synchronization server 400, and the image forming apparatus 50.

As illustrated in FIG. 4, the integrated management server 30 includes a setting management unit 301, a setting storage unit 302, and a communication control unit 303. Some or all of the devices described above may be configured by software that is programs or hardware that is electrical circuits.

The setting management unit 301 registers the usage authority information at the setting storage unit 302. Specifically, the setting management unit 301 creates the usage authority information based on the administrator's operation at the administrator terminal 20, and registers the created usage authority information at the setting storage unit 302. That is, the setting management unit 301 provides the UI of the administrator terminal 20 to set the usage authority information. The setting management unit 301 accepts selection of one or more functions and one or more image forming apparatuses 50 to which the one or more functions are applied, and then accepts the selection of the user to be associated with the functions and the image forming apparatuses, thereby generating the usage authority information. Alternatively, the setting management unit 301 may accept selection of one or more functions and one or more users associated with the one or more functions, and then may accept selection of one or more image forming apparatuses 50 to which the one or more functions are applied, thereby generating the usage authority information.

In other words, to create the usage authority information, the setting management unit 301 accepts the selection of the function information and the device information, and accepts the selection of the user associated with the selection of the function information and the device information, thereby generating the usage authority information. Alternatively, to create the usage authority information, the setting management unit 301 may accept the selection of the function information and the user information, and may accept the selection of the device information that is applied the function information and the user information, thereby generating the usage authority information. After generating the usage authority information, the setting management unit 301 registers the created usage authority information at the setting storage unit 302. The user may belong to a group constituted by a plurality of users. In this case, the setting management unit 301 accepts the user information to be selected as either user information as one user or user information of the user included in the group. That is, for one user, multiple authorities are not granted, but one authority is granted.

The setting storage unit 302 also stores the authentication information acquired from the authentication server 10. The communication control unit 303 controls transmission and reception of various information between the authentication server 10, the administrator terminal 20, the synchronization server 40, and the like via the communication interface I/F 35. For example, the communication control unit 303 receives the authentication information from the authentication server 10. Further, the communication control unit 303 receives various setting information related to the usage authority information from the administrator terminal 20. The communication control unit 303 transmits the various kinds of information stored in the setting storage unit 302 to the synchronization server 40.

FIGS. 5A to 5C are tables illustrating an example of information stored in the setting storage unit 302. FIG. 5A is a table illustrating an example of a user table and user table data stored in the setting storage unit 302. FIG. 5B is a table illustrating an example of an authorization assignment table and data of the authorization assignment table stored in a setting storage unit 302. FIG. 5C is a table illustrating an example of a device table and data of the device table stored in a setting storage unit 302.

As illustrated in FIG. 5A, the user ID, the user name, the password, and the authority ID are associated with each other and stored in the user table. The user ID is information to identify the user. The user name is information to indicate the name of the user. The password is information of a number or a character string used in the authentication process. The authority ID is information to identify authority of the user. As illustrated in FIG. 5A, one authority is associated with one user.

As illustrated in FIG. 5B, the assignment ID, the authority ID, an authority content, and the device ID are associated with each other and stored in the authority assignment table. The assignment ID is information to identify each piece of information in the authority assignment table. The authority ID is information to identify the authority. The authority content is information to indicate the content of the authority. For example, the authority content includes information that printing in black and white is available for use by the authorized user and information that copying in full color is available for use by the authorized user. The device ID is information to identify the image forming apparatus 50. As illustrated in FIG. 5B, a plurality of image forming apparatuses 50 are associated with one authority. In addition, one authority may include a plurality of different authority information.

As illustrated in FIG. 5C, the device ID and a serial number are associated with each other and stored in a device table. The device ID is information to identify the image forming apparatus 50. The serial number is information (for example, a manufacturing number or the like) previously allocated to the image forming apparatus 50. The setting storage unit 302 may store a table in which the authority ID and the information of "authority name" indicating the name of the authority are associated with each other.

FIG. 6 is a diagram illustrating an outline of usage authority data. The outline of the usage right information illustrated in FIG. 6 corresponds to the information stored in the setting storage unit 302 described above. For example, as illustrated in FIG. 6, authority 1 corresponds to the function information that monochrome printing is available in a device 1, a device 2, and a device 3, the function information that monochrome copy is possible in the device 1, the device 2, and the device 3, and the function information that other functions are unusable in other devices. In addition, User A and user group A are associated with the authority 1. The authority 1 and the user A and the user group A associated with the authority 1 are one piece of the usage authority information. That is, the usage authority information is information in which a user ID is associated with authority information including one or more pieces of information in which the device ID and the function information are associated with each other.

Next, the usage authority information is described. As described above, using the UI provided by the integrated management server 30, the administrator operates the administrator terminal 20 and sets the usage authority information. FIG. 7 is a diagram illustrating an example of an authority management screen. A Permission Settings tab illustrated in (1) of FIG. 7 is a UI to create the authority. A Departments tab, a Groups tab, and a Users tab illustrated in (2) of FIG. 7 are UIs to select the object to which a content created in the Permission Settings tab is applied (see FIG. 9). That is, in the Departments tab, the department in a company, etc., is specified. In the Groups tab, a group consisting of multiple users is specified. In the Users tab, the user is specified.

In an item of Permission Name and Permission Description illustrated in (3) of FIG. 7, an authority name indicating the name of authority and a description of authority can be set. The Permission tab illustrated in (4) of FIG. 7 (Permission 1 to Permission 4 are illustrated in FIG. 7) is a UI to set the authority to be applied to each device. For example, pressing a + tab adds the Permission tab, and pressing a − tab deletes the Permission tab.

Built-in Functions illustrated in (5) of FIG. 7 is a UI to select the function information of function built in the device. For example, the Built-in Functions includes function information on copying, function information on printing, and function information on other functions. "Allow all Built-in Applications", when selected, allows the user to use all the function information. "Deny Login", when selected, prohibits the user from using devices. As described later, "Deny Login" is equivalent to refusing login.

"Workflows" illustrated in (6) of FIG. 7 is a UI to select the function information of a workflow. For example, the workflow is a processing group to be executed after scan, and is defined by the user. As the workflow, a series of processes such as scanning, PDF conversion, time stamp embedding, distribution to a file server, and the like are given as examples. The authority that permits the user to do all the workflows is given when the "Allow all Workflows" is selected.

"Target Devices" illustrated in (7) of FIG. 7 is a UI to select the device to which the created authority is applied. For example, the administrator presses the "Edit Device List" button and selects the device to which authority is to be applied from a dialog (see FIG. 8) for selecting the device. As a result, in the "Target Devices", a list of the devices selected in the dialog for selecting the device is displayed.

Figure 8:
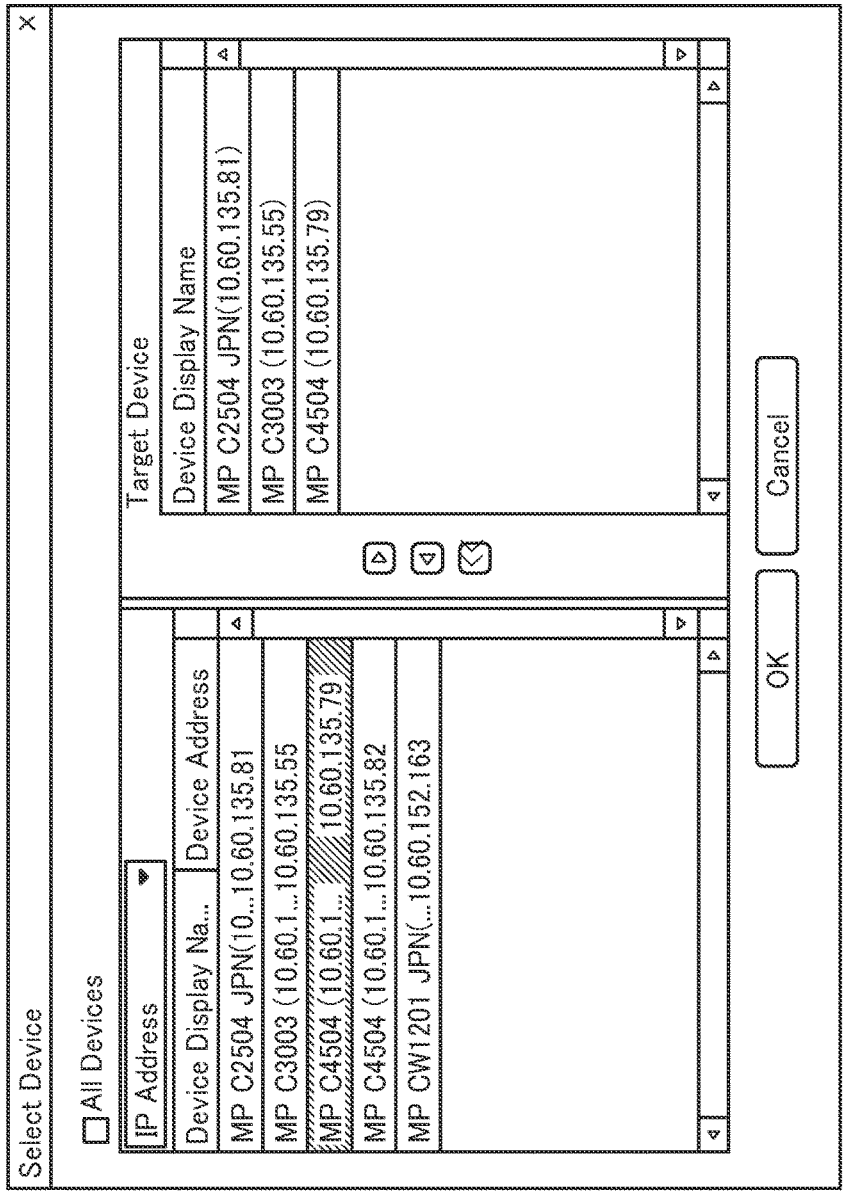
FIG. 8 is a diagram illustrating a dialog to select a device.

FIG. 8 is a diagram illustrating a dialog to select the device. As illustrated in FIG. 8, in the dialog to select the device, that is, the "Select Device" dialog, the administrator selects the device to which the authority is applied from the devices listed in left side, moves the selected device to right side, and presses the "OK" button. As a result, the selected device is a device to which the corresponding authority is applied. Checking "All Devices" leads to select all devices. One "authority" (for example, "authority 1", "authority 2", and "authority 3" illustrated in FIG. 6, respectively) includes all devices. The same function information may be set for all the devices like "authority 3" illustrated in FIG. 6, or different function information may be set for each device like "authority 1" or "authority 2" illustrated in FIG. 6. However, as described above, one user receives one authority. That is, as illustrated in FIG. 6, only "authority 1" is given to user A, and "authority 2" and "authority 3" are not given to user A.

FIG. 9 is a diagram for describing an example of selecting an object to which the authority is to be applied. A user addition/deletion button illustrated in (8) of FIG. 9 is a UI to add the user to whom the selected authority is assigned or release the assignment of the selected user. For example, using the dialog to select the user (see FIG. 10), pressing the + tab adds the user, and pressing − tab releases the assignment of the selected user. The list of users illustrated (9) of FIG. 9 is a list of users to whom the selected authority is assigned. For example, FIG. 9 illustrates that users "asdf" and "bbb" are assigned to "authority 2" as the selected authority.

In the selection of the object to which the authority is to be applied, when the user has user information of one user and user information of a group or a department composed of a plurality of users, either one of the two pieces of user information can be preferentially selected. For example, when the user A is in the group X and the authority is applied to both the user A and the group X, the information of overlapping application of the authority for the user A is output. This makes it possible to select either one preferentially.

Figure 10:
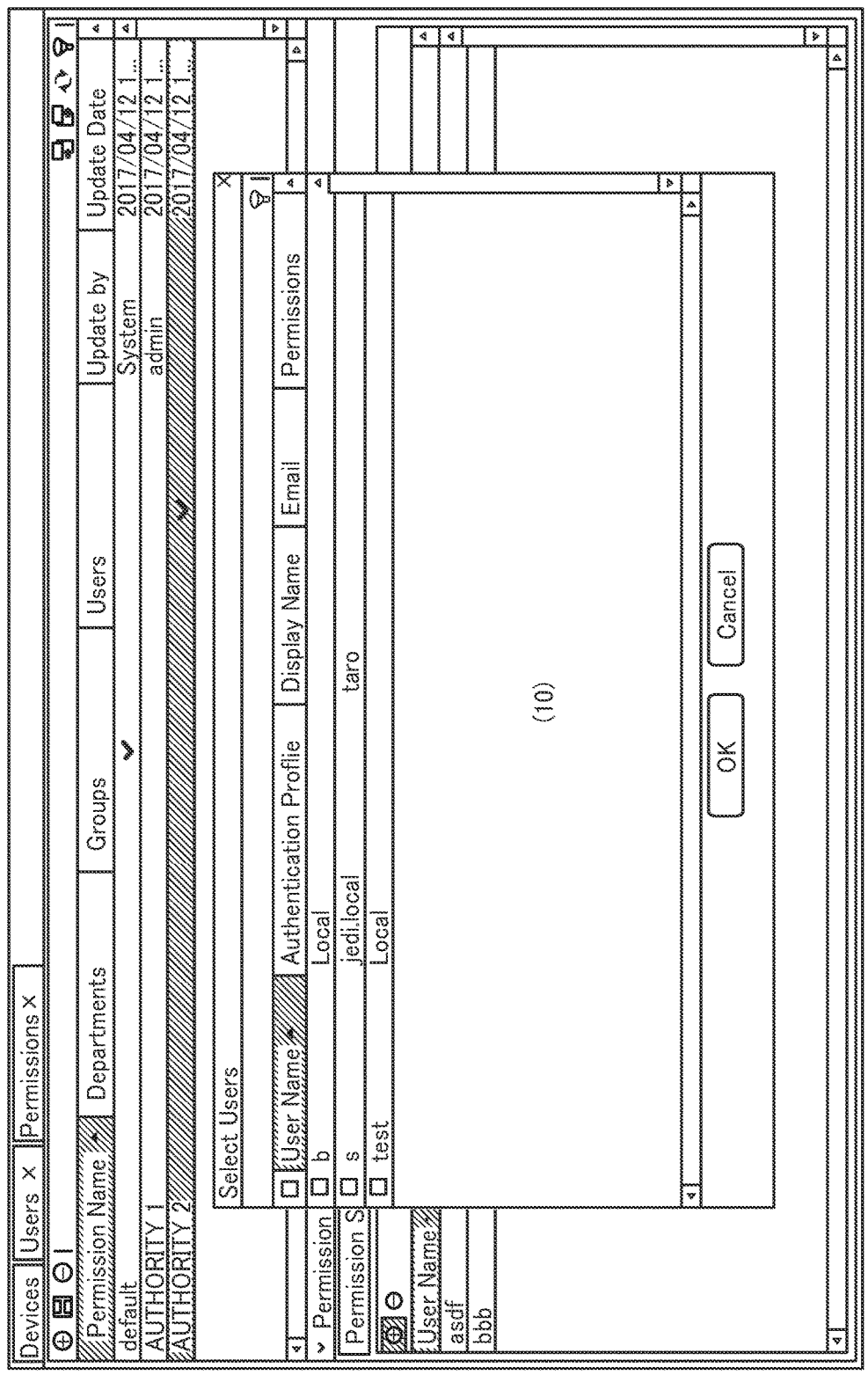
FIG. 10 is a diagram illustrating a dialog to select a user.

FIG. 10 is a diagram illustrating an example of the dialog to select the user. As illustrated in (10) of FIG. 10, the administrator selects the user to which the selected authority is applied from the displayed user information in the dialog to select the user, that is, check a box in "Select User" dialog, and presses an OK button. This operation makes the selected user information to apply the selected authority and the user information is added to (9) in FIG. 9.

FIG. 11 is a diagram illustrating an example of a user management screen. As illustrated in (11) of FIG. 11, the administrator selects the "Users" tab on the upper part of FIG. 9 to select the user, and selects the authority to be assigned to the selected user on the "Permissions" tab. This operation assigns the selected user the selected authority.

As an example, a procedure to create the usage authority information of "authority 2" illustrated in FIG. 6 is specifically described. First, the administrator creates the user information. Specifically, the administrator presses the + tab illustrated in the upper part of FIG. 11. Next, the administrator inputs the user information (User B) from the "User Setting" tab of the "User Properties" illustrated in the lower part of FIG. 11. The administrator may input the user information based on the authentication information stored in the authentication server 10. In this manner, the administrator adds three pieces of user information. The three users corresponding to the three pieces of user information belong to "Department A" illustrated in FIG. 6.

Next, the administrator creates the user information about departments. Specifically, the administrator creates the user information about "Department A" as the department, and makes the above three users belong to "Department A". The administrator may create the user information about the department based on the preliminarily stored information.

Next, the administrator creates the authority. Specifically, the administrator creates Permission Name "authority 2" in (3) of FIG. 7. Next, the administrator presses the + tab illustrated in (4) of FIG. 7 and sets the following settings in "Permission Properties". The administrator checks a box in "Full Color" of "Copier" and "Full Color" of "Printer" both of which are in "Built-in Functions". The administrator presses "Edit Device List" and selects "Device 1", "Device 2" and "Device 3".

Subsequently, the administrator presses the + tab illustrated in (4) of FIG. 7 and checks the box of "Deny Login" of "Built-in Functions" on the newly opened tab. The administrator presses "Edit Device List" and selects "Device 4" and "Device 5" in the dialog to select the device.

After that, the administrator presses the + tab illustrated in (4) of FIG. 7 and checks the box of "Black and White" of "Copier" and "Black and White" of "Printer" both of which are in "Built-in Functions" on the newly opened tab. The administrator presses "Edit Device List" and selects all the remaining devices from the dialog for selecting the devices.

Next, the administrator assigns the authority. Specifically, the administrator presses the "Users" tab illustrated in (2) of FIG. 7 and opens the screen illustrated in FIG. 9. The administrator presses the + tab illustrated in (8) of FIG. 9 for "authority 2" and selects "User B" from the dialog for selecting the user. The administrator also presses the "Departments" tab illustrated in (2) of FIG. 7 and opens the screen illustrated in FIG. 9. The administrator presses the + tab illustrated in (8) of FIG. 9 for "authority 2" and selects "Department A" from the dialog for selecting the user. This operation creates the usage authority information of "authority 2" illustrated in FIG. 6.

Returning to the description of FIG. 4, the synchronization server 40 includes a communication control unit 401, a setting management unit 402, a setting storage unit 403, and an authentication unit 404. Some or all of the devices described above, other than the setting storage unit 403, may be configured by software that is programs or hardware that is electrical circuits.

The setting management unit 402 registers the usage authority information at the setting storage unit 403. Specifically, the setting management unit 402 acquires the usage authority information from the integrated management server 30 and registers the acquired usage authority information in the setting storage unit 403. The setting management unit 402 acquires the usage authority information from the integrated management server 30 via the communication I/F 45 under the control of the communication control unit 401. Each synchronization server 40 executes registration of the usage authority information. That is, the information stored in the setting storage unit 403 is the same as the information stored in the setting storage unit 302 of the integrated management server 30. The communication control unit 401 controls transmission and reception of various kinds of information with the integrated management server 30, the image forming apparatus 50, and the like via the communication I/F 45. For example, the communication control unit 401 receives the login request from the image forming apparatus 50, and transmits an authentication processing result or response information for the login request.

The authentication unit 404 specifies the function information based on the user information and the device information, and creates response information in which the specified function information is set. Specifically, the authentication unit 404 receives the login request from the image forming apparatus 50 via the communication control unit 401. For example, the login request from the image forming apparatus 50 includes information such as the user name and password of the user who operates the login request, a serial number of the image forming apparatus 50, and the like. The authentication unit 404 refers to the user table (see FIG. 5A) and confirms the existence of the user name and password included in the login request. If the user name and the password do not exist in the user table, the authentication unit 404 responds information indicating that authentication has failed to the image forming apparatus 50 via the communication control unit 401.

On the other hand, when the user name and the password exist in the user table, the authentication unit 404 acquires the authority ID corresponding to the user name and the password from the user table. Subsequently, the authentication unit 404 refers to the authority assignment table (see FIG. 5B) and acquires the device ID corresponding to the authority ID. The authentication unit 404 may acquire a plurality of device IDs. Thereafter, the authentication unit 404 refers to the device table (see FIG. 5C) and confirms whether the serial number included in the login request and the acquired device ID are associated with each other. If the serial number and the device ID are not associated with each other in the device table, the authentication unit 404 responds to the image forming apparatus 50 via the communication control unit 401 with information indicating that authentication has failed.

If the serial number and the device ID are associated with each other in the device table, the authentication unit 404 refers to the authority assignment table and specifies authority contents corresponding to the authority ID and the device ID. Then, the authentication unit 404 creates response information in which each piece of function information of the specified authority contents is set. Subsequently, the authentication unit 404 responds with the created response information to the image forming apparatus 50 as the login request source via the communication control unit 401.

FIG. 12 is a diagram illustrating an example of the response information according to the embodiment. As illustrated in FIG. 12, the response information is a text file in which usable function information is set. For example, whether execution of full-color copying and monochrome copying in the copy function is permitted is set in the response information. Functions permitted to execute is described as "true", and functions not permitted to execute is described as "false" in the response information as illustrated in FIG. 12. Also, if all the functions of the image forming apparatus 50 are unusable, "denyLogin" is set to "true". A case in which "denyLogin" is "true" has the same meaning as refusal of login for the user.

As illustrated in FIG. 4, the image forming apparatus 50 includes a communication control unit 501, an operation display control unit 502, a setting unit 503, and an execution control unit 504. Some or all of the above-mentioned units may be implemented with software or hardware.

The operation display control unit 502 controls input-output processing of various information in the image forming apparatus 50. Specifically, the operation display control unit 502 controls an operation input and a display output with respect to a touch panel or the like mounted on the image forming apparatus 50. For example, the operation display control unit 502 receives the login operation by the user operation on the touch panel. Upon receiving the login operation, the operation display control unit 502 outputs the login request to the synchronization server 40 via the communication control unit 501. When the operation display control unit 502 receives information that authentication processing has failed from the synchronization server that executes the authentication processing, the operation display control unit 502 controls display output for a touch panel that displays failure of the authentication processing.

The setting unit 503 sets the function information of the response information in the operation display control unit 502. Specifically, the setting unit 503 acquires the response information from the synchronization server 40 that creates the response information via the communication control unit 501. Then, the setting unit 503 creates a function list screen set the function information available to the user who performs the login operation, and outputs the function list screen to the operation display control unit 502. The operation display control unit 502 controls the display output to the touch panel of the function list screen created by the setting unit 503. Based on the function list screen, the user selects the function which the user wants to execute in the image forming apparatus 50 and operates the image forming apparatus 50 to execute the function which the user selects. Based on the user's operation, the operation display control unit 502 requests the execution control unit 504 to execute the selected function. When the setting of "denyLogin" included in the response information is "true", the setting unit 503 creates a screen indicating the login is refused. The operation display control unit 502 controls the display output to the touch panel of the screen indicating that the login is refused.

The execution control unit 504 controls execution of various functions in the image forming apparatus 50. Specifically, the execution control unit 504 executes the selected function according to a request from the operation display control unit 502. In other words, the function whose execution is controlled by the execution control unit 504 is any one of the user information of the user who executes the login operation and the function included in the authority corresponding to the device information of the image forming apparatus 50 logged in.

Figure 13:
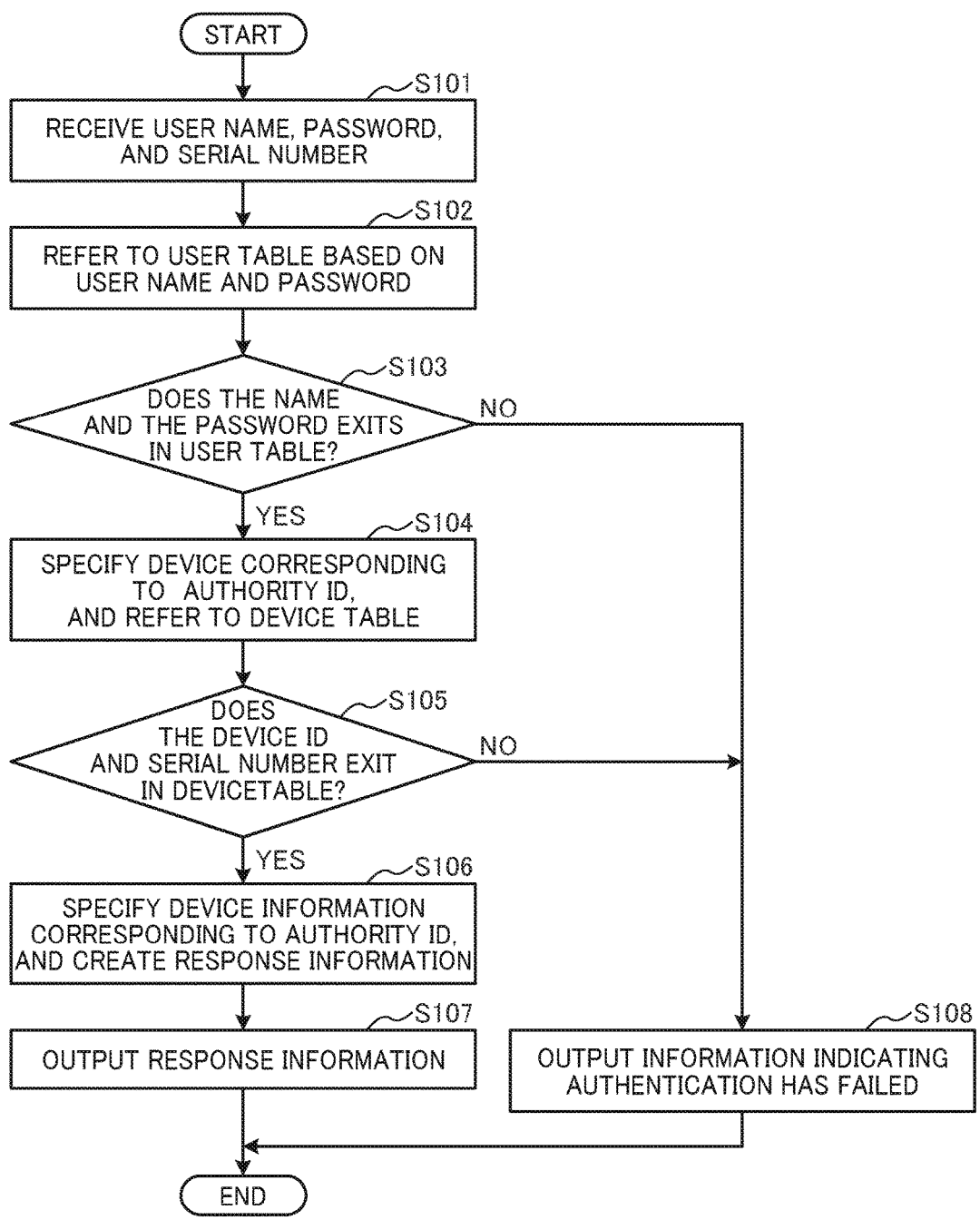
FIG. 13 is a flowchart illustrating an example of an authentication process according to the present embodiment.

Next, with reference to FIG. 13, the authentication process according to the embodiment is described. FIG. 13 is a flowchart illustrating an example of an authentication process according to the present embodiment.

As illustrated in FIG. 13, the synchronization server 40 receives the login request including information such as the user name, the password, the serial number and the like from the image forming apparatus 50 (step S101). Subsequently, the synchronization server 40 refers to the user table based on the user name and the password (step S102), and determines whether the user name and the password exist in the user table (step S103). When the user name and the password do not exist in the user table (NO in step S103), the synchronization server 40 outputs information indicating that authentication has failed to the image forming apparatus 50 (step S108).

On the other hand, when the user name and the password exist in the user table (YES in step S103), the synchronization server 40 acquires the authority ID corresponding to the user name and the password from the user table, refers to the authority assignment table, and specifies the device ID corresponding to the authority ID. The synchronization server 40 refers to the device table based on the specified device ID and the serial number included the login request. When the device ID and the serial number are not associated with each other in the device table (NO in step S105), the synchronization server 40 outputs information indicating that authentication has failed to the image forming apparatus 50 (step S108).

When the device ID and the serial number are associated with each other in the device table (YES in step S105), the synchronization server 40 refers to the authority assignment table, specifies the authority content corresponding to the authority ID and the device ID, creates the response information that is set each piece of function information of the specified authority content (step S106). Subsequently, the synchronization server 40 outputs the created response information to the image forming apparatus 50 as the login request source (step S107).

As described above, the authentication system 1 stores the usage authority information associated with both the user information and the device information, specifies the function information corresponding to the user information and the device information in response to the login request, and outputs the response information in which the specified function information is set to the image forming apparatus 50 as the login request source. As a result, the authentication system 1 limits use by each user and each MFP.

Operations, controlling operations, specific names, and information including various data and parameters described above and illustrated in drawings may be modified arbitrarily unless otherwise noted. Additionally, the components of each device are illustrated based on a functional concept, and not necessarily described as it physically is. That is, the specific embodiments of the devices, which are separated from each other or combined together, are not limited to the illustration disclosed, but include configurations in which some of or all of components are physically separated from each other or combined together as desired according to various types of loads or usage conditions. In the above embodiment, the integrated management server 30 and the synchronization server 40 are different devices, but these servers may be integrated. For example, it is also possible to provide the authentication system 1 in which the functions of the synchronization server 40 are integrated into the integrated management server 30.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing apparatus comprising:
one or more processors; and
one or more memories to store a plurality of instructions which, when executed by the processors, cause the processors to:
store, in the memories, usage authority information associating, for each of one or more users, user information identifying the user with authority information, the authority information associating, for each of one or more image forming apparatuses, device information comprising a serial number of an image forming apparatus and a device ID in association with each other, the device information identifying the image forming apparatus with function information indicating function of the image forming apparatus allowed to be executed or restricted from being executed;
receive a login request from the user for the information processing apparatus that including the serial number of the image forming apparatus and the user information of the user;
acquire device information associated with the user information;
perform an authentication process based on whether the serial number of the image forming apparatus is associated with a device ID from the acquired device information;
based on success of the authentication process for the login request from the user to the image forming apparatus, specify the function information corresponding to the device information of the image forming apparatus as the login request source, using the usage authority information corresponding to the user information of the user who requested the login;
create response information set with the specified function information; and
send the created response information to the image forming apparatus as the login request source.

2. The information processing apparatus according to claim 1,
wherein the authentication of the login request is user authentication performed using the user information of the user who requested the login.

3. The information processing apparatus according to claim 1,
wherein the authentication of the login request is user authentication performed using the device information of the image forming apparatus as the login request source.

4. The information processing apparatus according to claim 1,
wherein, when the usage authority information includes function information that indicates all functions of the image forming apparatus are unusable, the created response information indicates that the login request is refused.

5. The information processing apparatus according to claim 1,
wherein, in the usage authority information, the user information is associated with any of the authority information including the device information of all of the one or more image forming apparatuses under management.

6. The information processing apparatus according to claim 1,
wherein the processors are further configured to:
accept selection of the user to be associated with the functions and the image forming apparatuses after accepting selection of one or more functions and one or more image forming apparatuses to which the one or more functions are applied;
create the usage authority information by the selections; and
register the created usage authority information.

7. The information processing apparatus according to claim 1, wherein the processors are further configured to:
accept selection of the one or more image forming apparatuses to which the one or more functions are applied after accepting selection of one or more functions and the one or more users which is associated with the one or more functions;
create the usage authority information by the selections; and
registering the created usage authority information.

8. The information processing apparatus according to claim 6,
wherein the processors are further configured to accept a setting of the selection of the user as to which of the user information as one user or the user information of the user included in a group.

9. The information processing apparatus according to claim 7,
wherein the processors are further configured to accept a setting of the selection of the user as to which of the user information as one user or the user information of the user included in a group.

10. An information processing apparatus comprising:
circuitry configured to store usage authority information in which user information to identify a user is associated with authority information including one or more pieces of information in which apparatus information to identify an image forming apparatus comprising a serial number of the image forming apparatus and a device ID in association with each other is associated with function information that shows function allowed to be executed by the image forming apparatus or restricted functions that are to be executed;
the circuitry configured receive a login request from the user for the information processing apparatus that including the serial number of the image forming apparatus and the user information of the user;
the circuitry configured to acquire device information associated with the user information;
the circuitry configured to perform an authentication process based on whether the serial number of the image forming apparatus is associated with a device ID from the acquired device information;
the circuitry configured to refer to the usage authority information, after user authentication for the login request to the image forming apparatus, from the user information of the user who requested the login and the device information of the image forming apparatus as the login request source, to specify the corresponding function information, and to create response information set the specified function information; and
the circuitry configured to send the created response information to the image forming apparatus as the login request source.

11. An authentication system comprising:
a synchronization server comprising:
one or more first processors; and
one or more first memories storing a first plurality of instructions; and
an integrated management server comprising:
one or more second processors; and
one or more second memories storing a second plurality of instructions which, when executed by the one or more second processors, directs integrated management server to:
acquire usage authority information, the usage authority information associating, for each of one or more users, user information identifying the user with authority information, the authority information associating, for each of one or more image forming apparatuses, device information comprising a serial number of an image forming apparatus and a device ID in association with each other, the device information identifying the image forming apparatus with function information indicating function allowed to be executed or restricted from being executed; and
transmit the usage authority information acquired to the synchronization server;
the second plurality of instructions which, when executed by the one or more first processors, directs the synchronization server to:
accept the usage authority information from the integrated management server;
receive a login request from a user for an information processing apparatus that including the serial number of the image forming apparatus and the user information of the user;
acquire device information associated with the user information from the integrated management server.
perform an authentication process based on whether the serial number of the image forming apparatus is associated with a device ID from the acquired device information;
based on success of the authentication process for the login request from the user to the image forming apparatus,
specify the function information corresponding to the device information of the image forming apparatus as the login request source, using the usage authority information corresponding to the user information of the user who requested the login;
create response information in which specified function information is set; and
send the created response information to the image forming apparatus as the login request source.

* * * * *